L. KALINA.
COMBINED CUFF BUTTON AND CUTTER.
APPLICATION FILED JUNE 13, 1912.
1,048,415.
Patented Dec. 24, 1912.
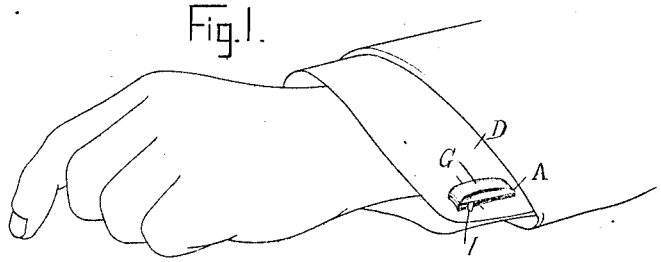
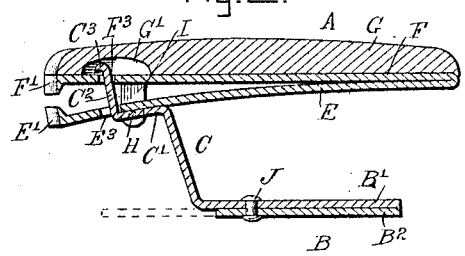
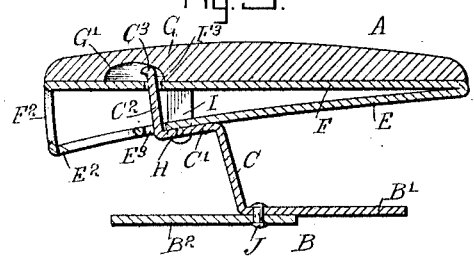
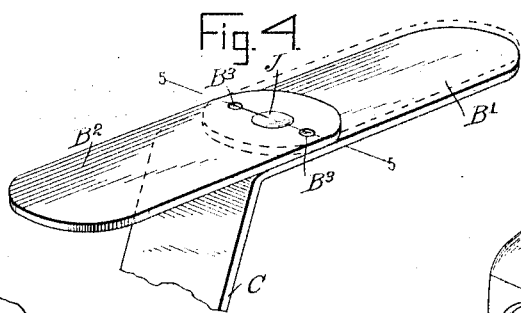
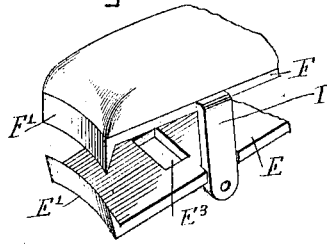
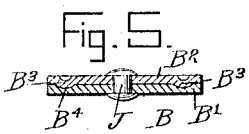
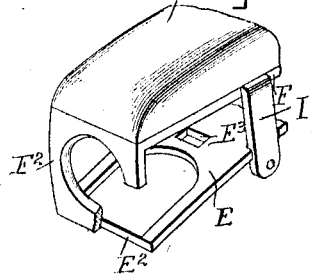
WITNESSES
INVENTOR
Loeser Kalina
BY
ATTORNEYS

UNITED STATES PATENT OFFICE.

LOESER KALINA, OF NEW YORK, N. Y.

COMBINED CUFF-BUTTON AND CUTTER.

1,048,415. Specification of Letters Patent. Patented Dec. 24, 1912.

Application filed June 13, 1912. Serial No. 703,410.

*To all whom it may concern:*

Be it known that I, LOESER KALINA, a citizen of the United States, and a resident of the city of New York, borough of Brooklyn, in the county of Kings and State of New York, have invented a new and Improved Combined Cuff-Button and Cutter, of which the following is a full, clear, and exact description.

The object of the invention is to provide a new and improved combined cuff button and cutter designed to be worn as a cuff button and adapted to be used as a cutter for cutting finger nails, cigars and the like.

For the purpose mentioned use is made of cutting members having movement one relative to the other and forming one head of the cuff button, a shank having connection with the said members for actuating the same, and a handle on the said shank and forming the other head of the cuff button.

A practical embodiment of the invention is represented in the accompanying drawings forming a part of this specification, in which similar characters of reference indicate corresponding parts in all the views.

Figure 1 is a perspective view of the combined cuff button and cutter, shown applied to a cuff for use as a cuff button; Fig. 2 is an enlarged sectional side elevation of the combination cuff button and cutter arranged as a nail cutter; Fig. 3 is a similar view of the same arranged as a cigar cutter; Fig. 4 is an enlarged perspective view of part of the shank and the sectional handle thereon; Fig. 5 is a cross section of the same on the line 5—5 of Fig. 4; Fig. 6 is a perspective view of the forward end of the nail cutter; and Fig. 7 is a like view of the forward end of the cigar cutter.

The combined cuff button and cutter consists essentially of the heads A and B connected with each other by a shank C, the device being adapted to be applied to a cuff D, as shown in Fig. 1, or used as a cutter, as hereinafter more fully described. The head A is formed of two cutting members E and F connected with each other at one end and provided at their free ends with co-acting cutting edges $E'$, $F'$ (see Figs. 2 and 6) or co-acting cutting edges $E^2$, $F^2$ (see Figs. 3 and 7). The co-acting cutting edges $E'$, $F'$ are concave and serve for cutting finger nails, while the cutting edge $F^2$ is circular and acts in conjunction with the straight cutting edge $E^2$ for cutting off the tip ends of cigars. The cutting member F is preferably overlaid with a covering G of mother-of-pearl or other suitable material to give a fine appearance to the device. The shank C is provided with an angular offset $C'$ engaging the under side of the cutting member E and connected by a pivot H with lugs I forming integral struck-up parts of the cutting member F. The angular offset $C'$ terminates in an extension $C^2$ passing through apertures $E^3$ and $F^3$ formed in the members E and F, and the said extension $C^2$ terminates in a head $C^3$ adapted to engage the upper surface of the member F to cause the latter to swing toward the member E at the time the latter swings toward the member F. The head $C^3$ extends in a cavity $G'$ formed in the covering G of the cutting member F. The head B is formed of two sections $B'$, $B^2$, of which the section $B'$ forms an integral part of the outer end of the shank C and extends approximately parallel to the member F of the head A, and the other section $B^2$ is connected by a pivot J with the section $B'$ to permit of swinging the section $B^2$ into a folded position relative to the section $B'$ so as to overlie the latter to permit of conveniently passing the head through the buttonholes of the cuff when using the device as a cuff button. After the head B has passed through the buttonholes of the cuff, the section $B^2$ is swung around into the position shown in full lines in Figs. 3 and 4, so as to form a continuation of the section $B'$ thus providing a secure head for holding the cuff button securely in place on the cuff. The section $B^2$ of the head B is held locked in an extended or folded position by the use of lugs or teats $B^3$ engaging corresponding recesses $B^4$ formed in the section $B'$, the said lugs $B^3$ and their recesses $B^4$ being arranged on opposite sides of the pivot J, as plainly indicated in the drawings.

When the device is used for cutting finger nails and cigars it is only necessary for the operator to take hold of the heads A and B between the thumb and forefinger, and then on pressing the heads toward each other the shank C acts as an actuating lever to swing the cutting members E and F toward each other with a view to close the cutting edges $E'$, $F'$ or $E^2$, $F^2$ to cut off a portion of the nail or the tip of a cigar, and when the pressure is released, the cutting members E and F swing apart owing to their resiliency.

In practice, the cutting members E and F are made of a single piece of steel, doubled up so as to form a pivot at the doubled-up end, as will be readily understood by reference to Figs. 2 and 3.

It is understood that as the cuff buttons are sold and used in pairs one of the cuff buttons will be provided with the cutting edges E', F' and the other cuff button will be provided with the cutting edges $E^2$, $F^2$ so that the pair of cuff buttons can be used, one for cutting the finger nails and the other for cutting off the tips of cigars.

The combined cuff button and cutter shown and described is very simple and durable in construction, and can be readily used as a cuff button or as a cutter for cutting off finger nails, cigar tips and the like.

Having thus described my invention, I claim as new and desire to secure by Letters Patent:

1. A combined cuff button and cutter, comprising two spaced heads and a shank connecting the said heads with each other, the heads being approximately parallel to permit using the device as a cuff button, one of the heads being formed of two cutting members and the other head forming a handle on the shank, the latter being in the form of an operating lever fulcrumed on one of the cutting members and engaging the other to move the cutting members toward each other to permit using the device as a cutter.

2. A combined cuff button and cutter, comprising two heads and a shank, one of the heads being formed of two cutting members and the other head forming a handle on the shank, the latter being in the form of an operating lever fulcrumed on one of the cutting members and engaging the other to move the cutting members toward each other, the said handle head being made in sections, of which one is integral on the shank and the other section is mounted to turn on the integral section to overlie the latter or to form an extension thereof.

3. A combined cuff button and cutter, comprising two heads and a shank, one of the heads being formed of two cutting members connected with each other at one end to swing toward each other, the free ends being provided with co-acting cutting edges, the said shank being in the form of a lever fulcrumed on one cutting member and having an angular offset engaging the other cutting member, and the other head being formed of two sections of which one is integral on the said shank and the other section is pivoted on the said integral section.

In testimony whereof I have signed my name to this specification in the presence of two subscribing witnesses.

LOESER KALINA.

Witnesses:
TheO. G. Hoster,
Philip D. Rollhaus.

Copies of this patent may be obtained for five cents each, by addressing the "Commissioner of Patents, Washington, D. C."